US012782593B2

(12) United States Patent
Limousin et al.

(10) Patent No.: US 12,782,593 B2
(45) Date of Patent: Nov. 3, 2026

(54) METHOD AND DEVICE FOR IDENTIFYING ATOMIC SPECIES EMITTING X- OR GAMMA RADIATION

(71) Applicant: COMMISSARIAT A L'ENERGIE ATOMIQUE ET AUX ENERGIES ALTERNATIVES, Paris (FR)

(72) Inventors: Olivier Limousin, Gif-sur-Yvette (FR); Geoffrey Daniel, Gif-sur-Yvette (FR); Daniel Maier, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 903 days.

(21) Appl. No.: 17/614,276

(22) PCT Filed: May 28, 2020

(86) PCT No.: PCT/EP2020/064790

§ 371 (c)(1),
(2) Date: Nov. 24, 2021

(87) PCT Pub. No.: WO2020/239884

PCT Pub. Date: Dec. 3, 2020

(65) Prior Publication Data

US 2022/0252744 A1 Aug. 11, 2022

(30) Foreign Application Priority Data

May 28, 2019 (FR) ...................................... 1905682

(51) Int. Cl.
*G01T 1/36* (2006.01)
*G06N 3/08* (2023.01)

(52) U.S. Cl.
CPC *G01T 1/36* (2013.01); *G06N 3/08* (2013.01)

(58) Field of Classification Search
None
See application file for complete search history.

(56) References Cited

U.S. PATENT DOCUMENTS

2003/0102428 A1* 6/2003 Atwell .................. G01N 23/09 250/252.1
2014/0021356 A1* 1/2014 Zwaans ................ G01T 1/2985 250/362

(Continued)

FOREIGN PATENT DOCUMENTS

CN 107229787 A * 10/2017 ............... G01T 1/36
CN 109 063 741 A 12/2018
JP 2014-524018 A 9/2014

OTHER PUBLICATIONS

R. A. Van Den Berg et al. Centering, scaling, and transformations. https://doi.org/10.1186/1471-2164-7-142 (Year: 2006).*

(Continued)

*Primary Examiner* — Alexey Shmatov
*Assistant Examiner* — Shishir Agrawal
(74) *Attorney, Agent, or Firm* — Baker Hostetler

(57) ABSTRACT

A method for identifying emitting species ($S_1$-$S_N$) emitting X- or gamma radiation in a scene, wherein a spectrum of the radiation is supplied as input of a first set of a plurality of convolutional neural networks, each convolutional neural network of the first set being associated with at least one atomic species to be identified and having at least one output indicative of the presence or the absence of the atomic species in the scene. Advantageously, a second set of a plurality of convolutional neural networks makes it possible to determine a signal proportion of each emitting species present in the X- or gamma radiation emanating from the scene. Also disclosed is a device for implementing such a method.

18 Claims, 10 Drawing Sheets

(56) References Cited

U.S. PATENT DOCUMENTS

| | | | | |
|---|---|---|---|---|
| 2014/0367582 | A1 | 12/2014 | Boardman | |
| 2019/0034786 | A1* | 1/2019 | Ghawaly | G01T 1/36 |
| 2021/0012917 | A1* | 1/2021 | Nunn | A61B 50/13 |

OTHER PUBLICATIONS

Gordon Gilmore. Practical Gamma-Ray Spectrometry. Second Edition. John Wiley & Sons Ltd. (Year: 2008).*

P. Kraipeerapun et al. Applying Duo Output Neural Networks to Solve Single Output Regression Problem. https://doi.org/10.1007/978-3-642-10677-4_63 (Year: 2009).*

Geoffrey E. Hinton et al. Improving neural networks by preventing co-adaptation of feature detectors. https://arxiv.org/abs/1207.0580 (Year: 2012).*

Dan Ciresan et al. Multi-column deep neural network for traffic sign classification. https://doi.org/10.1016/j.neunet.2012.02.023 (Year: 2012).*

G. Livadiotis et al. Fitting method based on correlation maximization. https://doi.org/10.1002/jgra.50304 (Year: 2013).*

Eleftherios Spyromitros-Xioufis et al. Multi-Label Classification Methods for Multi-Target Regression. https://arxiv.org/abs/1211.6581v4 (Year: 2014).*

Yarin Gal et al. Dropout as a Bayesian Approximation: Representing Model Uncertainty in Deep Learning. https://proceedings.mlr.press/v48/gal16.html (Year: 2016).*

M Kamuda et al. Automated Isotope Identification Algorithm Using Artificial Neural Networks. https://doi.org/10.1109/TNS.2017.2693152 (Year: 2017).*

Vaishali Tidake et al. Multi-label Classification: A Survey. https://doi.org/10.14419/ijet.v7i4.19.28284 (Year: 2018).*

John Williams et al. Introduction to Wavelets in Engineering. https://doi.org/10.1002/nme.1620371403 (Year: 1994).*

D. S. Vlachos. Self-calibration techniques of underwater gamma ray spectrometers. https://doi.org/10.1016/j.jenvrad.2004.11.004 (Year: 2005).*

Gordon Gilmore. Practical Gamma-ray Spectrometry. https://doi.org/10.1002/9780470861981 (Year: 2008).*

Christopher Allwork et al. X-Ray Beam Studies of Charge Sharing in Small Pixel, Spectroscopic, CdZnTe Detectors. https://doi.org/10.1109/TNS.2012.2195678 (Year: 2012).*

Daniel Maier et al. Energy calibration via correlation. http://dx.doi.org/10.1016/j.nima.2015.11.149 (Year: 2015).*

Lutter, et al., "A gamma-ray spectrometry analysis software environment", Applied Radiation and Isotopes, 134, pp. 200-204, 2018.

Vigneron, et al., "Statistical modelling by neural networks in gamma-spectrometry", Conference and International Symposium on Radionuclide Metrology, 1995.

Yoshida, et al., "Application of neural networks for the analysis of gamma-ray spectra measured with a Ge spectrometer", Nuclear Instruments and Methods in Physics Research, A 484, pp. 557-563, 2002.

Medhat, "Artificial intelligence methods applied for quantitative analysis of natural radioactive sources", Annals of Nuclear Energy, 45, pp. 73-79, 2012.

Olmos, et al., "A New Approach to Automatic Radiation Spectrum Analysis", IEEE Transactions On Nuclear Science, vol. 38, No. 4, pp. 971-975, 1991.

Bobin, et al., "Real-time radionuclide identification in y-emitter mixtures based on spiking neural network", Applied Radiation and Isotopes, 109, pp. 405-409, 2016.

Kamuda, et al., "Automated Isotope Identification Algorithm Using Artificial Neural Network", IEEE Transactions On Nuclear Science, vol. 64, No. 7, pp. 1858-1864, 2017.

Abdel-Aal, et al., "Determination of radioisotopes in gamma-ray spectroscopy using abductive machine learning", Nuclear Instruments and Methods in Physics Research, A 391, pp. 275-288, 1997.

Maier, et al., "Energy calibration via correlation", Nuclear Instruments and Methods in Physics Research, Section A, 2016.

Gal, et al., "Dropout as a Bayesian Approximation: Representing Model Uncertainty in Deep Learning", Proceedings of the 33rd International Conference on Machine Learning, vol. 48, 2016.

Gevin, et al., "Imaging X-ray detector front-end with high dynamic range: IDeF-X HD", Nuclear Instruments and Methods in Physics Research Section A: Accelerators, Spectrometers, Detectors and Associated Equipment, vol. 695 pp. 415-419, 2012.

Aloysius, et al., "A Review on Deep Convolutional Neural Network", International Conference on Communication and Signal Processing, Apr. 2017.

Ioffe, et al., "Batch Normalization: Accelerating Deep Network Training by Reducing Internal Covariate Shift", Proceedings of the 32nd International Conference on Machine Learning, 2015.

Hague, et al., "A comparison of adaptive and template matching techniques for radio-isotope identification", Proceedings of the SPIE, vol. 10986, pp. 1-12, 2019.

Jacobs, et al., "Adaptive Mixture of Local Experts", Neural Computation, vol. 3, pp. 79-87, Jan. 1, 1991. XP093293289.

* cited by examiner

METHOD AND DEVICE FOR IDENTIFYING ATOMIC SPECIES EMITTING X- OR GAMMA RADIATION

CROSS-REFERENCE TO RELATED APPLICATIONS

This application is a National Stage of International patent application PCT/EP2020/064790, filed on May 28, 2020, which claims priority to foreign French patent application No. FR 1905682, filed on May 28, 2019, the disclosures of which are incorporated by reference in their entirety.

FIELD OF THE INVENTION

The invention relates to a method and a device for identifying emitting species emitting X- or gamma radiation, and preferentially for quantitatively determining the contribution of each species to the radiation. It relates to the technical field of nuclear instrumentation, and more specifically X- and gamma spectroscopy.

BACKGROUND

The invention applies whenever it is necessary to identify radionuclides and/or atomic species exhibiting an X-fluorescence in a sample or in an environment: radiochemistry, chemical and radiochemical analyses, decontamination and dismantling of nuclear sites, etc.

X- or gamma radiation is understood to be an electromagnetic radiation of energy greater than 100 eV; more particularly, in the context of the invention, the focus is on a radiation of energy lying between approximately 2 keV and 2 MeV. The distinction between X- and gamma radiation is not based on the nature of the radiation, but on its origin: an X-radiation has an electronic origin (typically, electronic transitions involving internal energy levels) whereas a gamma radiation is of nuclear origin. Also, the invention makes it possible to identify radionuclides (isotopes) from their gamma radiation spectrum and atomic species that are not necessarily radioactive based on their X-fluorescence spectrum. The atomic species that can be identified from their X-fluorescence spectrum and the radionuclides that can be identified from their gamma spectrum are indicated jointly by the expression "emitting species". Hereinbelow, the case where the emitting species are radionuclides will be more specifically considered, but, unless indicated otherwise, everything stated can also be applied to X-emitters.

The conventional methods for identifying radionuclides based on their gamma radiation are based primarily on the extraction of the photoelectric peaks in the spectrum deriving from the acquisition of the detector or on the study of zones of interest in the spectrum. See for example (Lutter 2018).

In this type of method, spectral signatures characteristic of the radionuclides of interest (gamma or X-ray lines) are fitted to a Gaussian module and a continuous background to deduce therefrom their position in terms of energy. One or more peaks present in the spectrum are compared simultaneously to the tables of the nuclear lines of the radioactive isotopes (or to the X-fluorescence lines of the different elements), which allows them to be identified.

These methods present the drawback of requiring recourse to an expert to identify the zones of interest of the spectrum. Furthermore, they require sufficient photon statistics to clearly reveal the peaks to be identified. The information contained in the continuous background of the spectrum (Compton background) is lost.

Such methods can be accompanied by artificial intelligence techniques, and notably neural networks. As early as 1995 (Vigneron 1995) it was proposed to analyze gamma emission peaks by means of a neural network of "multilayer perceptron" type to determine the rate of enrichment of the uranium. More recently, (Yoshida 2002) applied a neural network of "multilayer perceptron" type to the identification of radionuclides in a mixture, and (Medhat 2012) to a quantitative radiochemical analysis. The use of artificial intelligence techniques does not however make it possible to overcome all of the drawbacks of these approaches, and notably the need for an "expert" preprocessing to determine the regions of interest of the spectra to be analyzed.

Other techniques allow all of a spectrum to be analyzed, without the need for expert preprocessing.

For example (Olmos 1991) proposes using a neural network to identify radionuclides in a mixture based on the entire gamma radiation spectrum emitted by the latter. The article does not specify the type of neural network actually used; furthermore, the required signal level must be relatively high (approximately $10^4$ photons detected only in the main emission peak).

(Bobin 2016) uses "spiking neural networks" to determine the proportion of radionuclides in a mixture based on the gamma radiation spectrum emitted thereby. The method requires an accurate model of the spectrum of the source and is not robust to changes of configuration (variations of the rate of attenuation/scattering of the radiation). Furthermore, it does not make it possible to identify the radionuclides: also, it is not possible to know whether the atomic species found in low proportions are absent or are really present in low proportions.

(Kamuda 2017) uses a neural network of perceptron type, trained on synthetic data, to determine the proportion of each radionuclide contributing to the gamma radiation emitted by a source. Intrinsically, the method makes it possible to identify only a limited number (for example 4) of distinct radionuclides.

(Abdel-Aal 1997) uses neural networks of abductive AIM type to determine the relative intensities of several sources based on spectra with low resolution, in which regions of interest are identified automatically. As in (Bobin 2016), it is not possible to know whether the atomic species found in low proportions are absent or are really present in low proportions.

US 2019/034786 discloses, generally and with little detail, the use of a multilayer perceptron to detect or identify radionuclides. The perceptron can have several outputs, each corresponding to an emitting species or to a group of emitting species.

CN 109 063 741 also discloses the use of neural networks to detect or identify radionuclides. More specifically, the document discloses the conversion of the spectra into two-dimensional images by means of a Hilbert curve before the application of a neural network.

SUMMARY OF THE INVENTION

The invention aims to overcome the abovementioned drawbacks of the prior art. More particularly, it aims to allow the identification of any number of emitting atomic species in a mixture based on the X- or gamma spectrum thereof, and do so independently of the configuration of the scene (presence of absorbent or scattering material between the source or sources present in environment and the spectrometric detector) and without sophisticated preprocessing including the identification of regions of interest of the spectrum.

Advantageously, furthermore, the invention aims to determine the probability of presence of each of the emitting species, and preferentially an uncertainty on this probability.

Advantageously, furthermore, the invention aims to determine the proportion in the signal of each identified source, and give an uncertainty on this proportion.

Advantageously, furthermore, the invention aims to allow the use of different types of spectrometric detector (CdTe, CdZnTe, $HgI_2$, NaI, HPGe or any type of gamma spectrometer operating within the keV to MeV energy band, etc.), provided that it is capable of measuring and restoring the energy of each detected event, event by event, or at the very least, supplying the spectrum of the measured energies.

Advantageously, furthermore, the invention aims to make it possible to avoid lengthy and complex fine energy calibration operations and overcome any drifts of the detector or of the operational conditions over time. Ideally, a factory calibration with an error of the order of 2% should be sufficient to identify the emitting species and, if necessary, determine their proportion.

According to one aspect of the invention, at least some of these aims are achieved through the use of a plurality of neural networks of convolutional type, each charged with identifying a single emitting species. As a variant, as will be discussed in more detail later, each neuron will be able to be charged with identifying a distinct group of emitting species.

According to another aspect of the invention, at least some of these aims are achieved through the use of a second plurality of neural networks of convolutional type, each charged with determining the proportion of a single, already identified emitting species (or group of emitting species).

According to another aspect of the invention, these neural networks are trained on synthetic spectral data.

According to another aspect of the invention, the spectra supplied as input to the neural networks for identifying emitting species are converted to the logarithmic scale beforehand.

According to another aspect of the invention, a “dropout” operation (random switching off of a fraction of the neurons of the internal layers) is applied to these neural networks in order to determine the levels of uncertainty on the presence, and if necessary on the proportion, of each emitting species.

According to another aspect of the invention, the different neural networks each have a pair of neurons of complementary outputs, using, for example, an activation function of “softmax” type.

According to another aspect of the invention, once the emitting species are identified, this information is used to perform an energy “self-calibration” of the detector.

One subject of the invention is therefore a method for identifying emitting species emitting X- or gamma radiation in a scene, the method comprising the following steps:

a) acquiring, by means of a spectrometric detector, a spectrum of an X- or gamma radiation emanating from the scene;

b) applying to the acquired spectrum a first data transformation operation including at least one normalization;

c) supplying the transformed spectrum as input of a first set of a plurality of convolutional neural networks, each convolutional neural network of said first set being associated with a respective emitting species to be identified, or with a respective group of emitting species to be identified and having at least one output; and d) for each convolutional neural network of the first set, determining whether the corresponding emitting species, or the corresponding group of emitting species, is present in the scene as a function of said output or outputs;

steps a) to d) being implemented by means of a signal processing circuit.

Another subject of the invention is a computer program product comprising instructions which, when the program is run by a computer, lead the latter to implement steps b) and subsequent steps of such a method.

Yet another subject of the invention is a device for identifying emitting species emitting X- or gamma radiation in a scene, comprising:

a signal processing circuit processing signals generated by a spectrometric detector, said circuit being configured or programmed to:

acquire from said detector a series of events, each event being associated with a physical quantity representative of an energy value of an X- or gamma photon detected by said spectrometric detector;

convert said series of events into an energy spectrum of the X- or gamma radiation by application of a calibration function dependent on a set of calibration parameters;

apply to the energy spectrum of the X- or gamma radiation a first data transformation operation including at least one normalization;

supply the thus-transformed spectrum as input of a first set of a plurality of convolutional neural networks, each convolutional neural network of said first set being associated with a respective emitting species, or with a respective group of emitting species, and having at least one output; and for each convolutional neural network of the first set, determine whether the corresponding emitting species or the corresponding group of emitting species is present in the scene as a function of said output or outputs.

According to particular embodiments of such a device:

The signal processing circuit processing signals generated by the radiation detector can also be configured or programmed to:

apply, to the energy spectrum of the X- or gamma radiation, a second data transformation operation including at least one normalization;

supply the thus-transformed spectrum as input of a second set of a plurality of convolutional neural networks, each convolutional neural network of said second set being associated with one or more respective emitting species having been determined as being present in the scene and having at least one output; and for each convolutional neural network of the second set, determine, as a function of said scalar output or pair of scalar outputs, a signal proportion of the species or of the corresponding emitting species.

The signal processing circuit processing signals generated by the radiation detector can also be configured or programmed to determine optimal values of said calibration parameters by maximization of a correlation function between an acquired spectrum and a theoretical spectrum calculated as a function of the emitting species determined as being present in the scene.

Each convolutional neural network can be associated with a single respective emitting species.

Each convolutional neural network can comprise a pair of complementary output neurons.

The X- or gamma photons detected can exhibit an energy within at least a part of the range lying between 2 keV and 2 MeV.

The device can also comprise said spectrometric detector (SPM).

BRIEF DESCRIPTION OF THE DRAWINGS

The attached drawings illustrate the invention.

DETAILED DESCRIPTION

Figure 1:
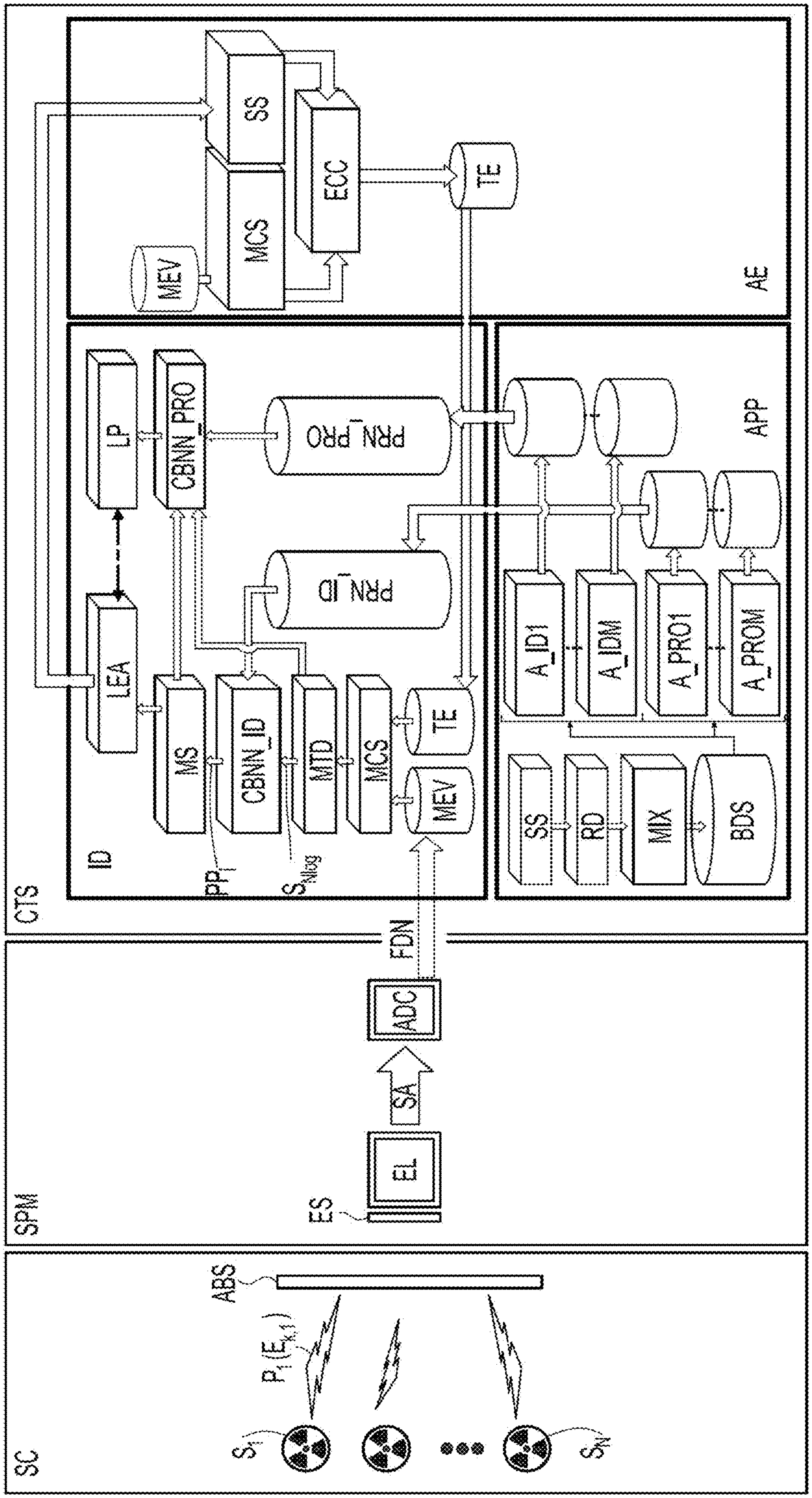
FIG. 1 is a block diagram of a device according to an embodiment of the invention.

The device of FIG. 1 comprises a spectrometric detector of X- or gamma radiation (that is to say a detector sensitive to the energy of the detected photons) and a signal processing circuit CTS for processing signals generated by the radiation detector.

The spectrometric detector SPM comprises a sensitive element ES, preferably pixelated, an analog reading circuit EL and an analog-digital converter ADC.

The spectrometric detector acquires photons emanating from a scene SC in which there are various radionuclides (or atomic species emitting a radiation of X-fluorescence) $S_i$ ($S_1 \ldots S_N$) of activity $A_i$ ($A_1 \ldots A_N$)—the identity and the relative abundance of which are a priori unknown—potentially situated at different distances from the detector. An absorbent or scattering material ABS can be situated between one or more sources and the detector. Each radionuclide $S_1$ emits photons $P_i$ with energies $E_{k,i}$. For example, $P_1(E_{k,1})$ is used to denote a photon of energy $E_{k,1}$ emitted by the first radionuclide $S_1$.

The sensitive element ES can be of any type suitable for detecting X/gamma photons emanating from the scene within at least a portion of the spectral range 2 keV-2 MeV. It can be, for example, a semiconductor pixel made of Si, Ge, CdTe, etc., a scintillation sensor, a perovskite sensor, etc.

The sensitive element generates a signal in the form of a physical quantity, generally electrical, representing the energy of each X- or gamma photon received (typically, it is a current pulse of which the electrical charge is proportional to that energy). The electronic reading circuit EL performs a conventional analog preprocessing of the signals coming from the sensitive element: amplification, shaping of the pulses, detection of their height or energy. The analog signals SA coming from the reading electronics are converted to digital format by the converter ADC.

Preferably, the photons are detected one by one, their energy is recorded and date-stamped by the detector. This information, contained in the digital data stream FDN from the converter ADC, is transmitted to the processing circuit CTS. The latter can be embedded or remote; in the latter case, a telecommunications link must be established between the spectrometric detector and the processing circuit.

The signal processing circuit can comprise one or more generic or dedicated processors for the digital processing of signals, programmed appropriately. As a variant or in addition, it can comprise dedicated digital circuits. In general, furthermore, it comprises random-access memories for storing the data to be processed (notably, the events generated by the spectrometric detector) and random-access and/or read-only memories for storing calibration parameters, neural network coefficients, etc. Generally, the invention is not limited to a particular signal processing circuit production technology. In the description hereinbelow of this circuit, the breakdown into blocks and modules is purely functional, these blocks and modules do not necessarily correspond to distinct physical elements.

In the embodiment of [FIG. 1], the signal processing circuit CTS comprises three modules: a source identification module ID, a training module APP and a self-calibration module AE. In other embodiments, the training module may be absent, in which case the training of the neural networks of the identification module is performed by means of another device and the coefficients of the neural networks learned are simply transferred to the device for identifying emitting species. In other embodiments, the self-calibration module may be absent, but that means that a precise calibration must be performed beforehand (for example in a metrology laboratory) and precautions will have to be taken to minimize the drifts in the response of the spectrometric detector.

The digital data stream FDN from the spectrometric detector is received by the identification module of the circuit CTS and stored in an event memory MEV. A spectra construction module MCS converts these events into spectra using a calibration table TE, stored in a memory, which makes it possible to associate a photon energy with each detection event. This calibration table, established beforehand, can be relatively imprecise, with an error on the energy values which can be as high as 2%. As will be explained in detail hereinbelow, the self-calibration module AE makes it possible to update the calibration tables to improve their accuracy. In the case of a pixelated detector, the calibration is done pixel by pixel, with a different calibration table for each pixel.

Each spectrum is in fact an energy histogram: an energy value is attributed to each event; the events are grouped into energy classes (“bins”) and the spectrum is composed of the number of events belonging to each class. “Spectrum” is therefore understood to mean the spectral distribution of the photons detected over a given time interval, the duration of which can be set or chosen by the user.

A data transformation module MTD then performs spectrum preprocessing operations. In the embodiment considered here, two distinct preprocessing operations are performed.

On the one hand, each acquired spectrum is converted to the logarithmic scale, then normalized. The thus-transformed spectrum, SNlog, is used for the identification of the emitting species. More particularly, let Si be the number of events in the i-th energy class. A first operation is applied.

$$S_{N_i'} = \log\left(\frac{S_i + 1}{\sum_j (S_j + 1)}\right) \quad \text{[Math. 1]}$$

Then, the normalized spectrum is calculated as follows:

$$S_{Nlog_i} = \frac{S_{N_i'}}{-\min(S_{N_i'})} + 1, \quad \text{[Math. 2]}$$

The use of a logarithmic scale makes it possible to reveal spectral structures of low amplitude but which effectively contribute to the identification of the emitting species.

On the other hand, the spectrum is also normalized to norm1 (which consists in ensuring that the sum of the values associated with each energy class is 1) without logarithmic conversion. The thus-transformed spectrum, SN1, given by:

$$S_{N1_i} = \frac{S_i}{\sum_j S_j} \quad \text{[Math. 3]}$$

is used to determine the proportions of the identified emitting species.

More generally, the preprocessing can be a scale transformation. In all cases, and contrary to the teaching of CN 109 063 741, there is no change of the dimensionality of the data—the preprocessing spectra remain one-dimensional.

The spectrum SNlog is supplied as input to a module CBNN_ID which implements a plurality of "Bayesian" convolutional neural networks M, each taking all of the spectrum as input and supplying at its output a value PPj indicative of a probability of presence in the scene of a particular radionuclide (identified by the index "j"), and a level of confidence on that probability. There is therefore a distinct neural network for each emitting species that is desired to be able to be identified. The structure and the operation of these Bayesian convolutional neural networks will be described in more detail hereinbelow.

A thresholding module MS is used to determine what emitting species are considered as being effectively present in the scene. For that, the thresholding module takes into consideration the probability of presence and, possibly, its level of uncertainty.

At the output of the identification module, a list LEA of emitting species present in the scene is therefore obtained.

The spectrum normalized to norm 1, SN1, is supplied as input to a module CBNN_PRO which implements a plurality of "Bayesian" convolutional neural networks, each corresponding to a particular radionuclide. Each neural network of the module CBNN_PRO which corresponds to a radionuclide "j" already identified as being present in the scene takes as input all of the spectrum and supplies at its output a value PROj indicative of the proportion of this radionuclide in the recorded signal, and a level of confidence on this proportion. In other words, the value PROj corresponds to the percentage of photons recorded which can be attributed to the radionuclide "j" (through a misuse of language, the expression "the proportion of the radionuclide "j" in the scene" is more simply used, but that is exactly the same only in particular conditions, if all the emitters are at the same distance from the detector and in the presence of the same absorbent/scattering materials). There is therefore a distinct neural network for each atomic species. These neural networks can be of the same type as those used for the identification of the emitting species.

At the output of the identification module, a list LP of proportions of the atomic species identified is therefore also obtained.

The neural networks of the modules CBNN_ID and CBNN_PRO have been previously trained by supervised training from a synthetic database BDS, that is to stay simulated data, generated by the training module APP. The training produces two databases of parameters, PRN_ID and PRN_PRO, characterizing the neural networks for identifying and determining the proportions, which are stored in memories.

The synthetic spectra are created by a Monte-Carlo simulator (block SS in FIG. 1) which makes it possible to simulate the photon-material interactions in the detector and in the direct environment of the detector and, advantageously, any background noise. For each photon, it is then necessary to apply the response of the detector, that is to say, the energy resolution due to the statistical fluctuations in the creation of electron-hole pairs, that due to the electronic noise and the loss of charge in the detector (block RD). This is a physical model which is applied just once for a given list of sources of interest comprising as many sources as are desired.

Each emitting atomic species is simulated independently and the simulated data are restored in the form of a list of events giving the energy deposited by each photon in the spectrometric detector. Next, mixtures of different radio elements are generated, also synthetically (MIX block): for that, energies in energy lists simulated for each radioelement of the mixture are randomly drawn, with different statistics and different proportions. The proportion of photons attributed to each emitting atomic species is recorded.

An intentional "decalibration" is then applied for the neural networks to learn the effect of a drift of the calibration laws. A gain g is drawn in a Gaussian centered on 1 and of standard deviation σgain, as is an offset off in a Gaussian centered on 0 and of standard deviation σoff. Over all the energies E of one and the same mixture, the new decalibrated energy Ed is then calculated by:

$$E_d = g(E - \text{off}) \quad \text{[Math. 3]}$$

Several decalibration synthetic spectra of each source and source mixture are recorded in the database BDS used for the training.

The blocks A_ID1-A_IDM implement the supervised training algorithms of the M convolutional neural networks of the block CBNN_ID, and produce M sets of parameters each characterizing these neural networks; these parameters are stored in the abovementioned database BDN_ID. Likewise, the blocks A_PRO1-A_PROM implement the supervised training algorithms of the M convolutional neural networks of the block CBNN_PRO, and produce M sets of parameters each characterizing these neural networks; these parameters are stored in the abovementioned database BDN_PRO.

The synthetic sources of the block SS are also used by the module AE in order to implement a process of self-calibration of the spectrometric detector. By knowing the radionuclides present in the source and their proportions (data supplied by the identification module ID), it is in fact possible to use these synthetic sources to calculate an "expected" spectrum. An algorithm of adaptive mesh or genetic algorithm type is then used by the block ECC to find a set of calibration parameters which maximizes the correlation between this expected spectrum and the one supplied by the module MCS. These parameters are used to update the calibration tables used by the module ID. It will be noted that certain blocks (MEV, MCS, SS, TE) appear at several points in [FIG. 1] in the interests of legibility.

The block ECC implements the energy calibration algorithm by correlation described in (Maier 2016).

This calibration does not require the intervention of the user and relies only on the measurement performed in real time in the scene to be analyzed.

The Bayesian convolutional networks used for the identification of the emitting atomic sources and the determination of their proportions will now be described with the aid of FIG. 2.

As is known per se—see for example (Aloysius 2017)—a convolutional network comprises a first part composed of several convolution layers making it possible to extract different characteristics of the input spectra and a second part consisting of a multilayer perceptron (in the literature, the expression "fully-connected" layers is also used).

In the embodiment of FIG. 1, the input consists of a spectrum SP0 comprising 2000 channels, each channel being a value representative of the energy of the spectrum within a respective spectral band.

The first convolutional layer CC1 comprises 16 convolutional neurons. Each convolutional neuron performs the following operations:

- filtering, by a convolutional filter having a kernel of 16 elements, with a zero filling to conserve the dimension of the data
- dimensional reduction of the output of the filter by a size two "Max Pooling" operation
- batch normalization
- application of a nonlinear activation function, in this case of ReLU type.

The size 2 Max Pooling operation consists in taking the spectrum and conserving only one channel in every two, the greater one. That reduces the dimension of the spectrum by a factor of 2.

The batch normalization operation—known per se, see (Ioffe 2015)—consists in collecting the data from the training database in subsets called batches, performing a training iteration on each of the batches (as will be described later), then normalizing in average and variance the outputs of each neuron corresponding to the batch considered. Once the training is done, the normalization parameters over the entire database are saved to apply the same normalization when the neural networks are used for the identification and the determination of the proportions of the emitting species.

The activation function ReLU is defined by:

$$\mathrm{ReLU}(x)=\max(0,x).$$

The output of the first convolutional layer therefore consists of 16 spectra of characteristics SP1,0-SP1,15 of 1000 dimension. These data are supplied as input to the second convolutional layer CC2 which is in all respects similar to the first, except that it operates on data of 1000 dimension.

The output of the second convolutional layer therefore consists of 16 spectra of characteristics SP2,0-SP2,15 of 1000 dimension. These data are supplied as input to the third convolutional layer CC3 which is in all respects similar to the first two, except that it operates on data of 500 dimension and its output therefore consists of 16 spectra of characteristics SP3,0-SP3,15 of 250 dimension.

The latter are flattened to form a vector SPA4 of 4000 elements which are all supplied as input to each of the 20 neurons of a perceptron layer CP using, like the convolutional layers, an activation function of ReLU type.

The last layer, or output layer, CS of the perceptron is preferentially composed of two neurons with an activation function of "softmax" type in which, using $x_i$ to denote the output of the neuron before the activation function:

$$\mathrm{softmax}(x_i) = \frac{\exp(-x_i)}{\sum_{j=\{1,2\}} \exp(-x_j)} \quad \text{[Math. 4]}$$

j being the index which identifies the two output neurons.

For the identification networks, the first neuron of the output layer gives a number lying between 0 and 1 which represents the absence or the presence of the radioelement in the mixture, while the second neuron is the one's complement of the first neuron.

For the networks evaluating the proportions, the first neuron gives a number lying between 0 and 1 which corresponds to the signal proportion of the radioelement while the second neuron corresponds to the signal proportion of all the other elements.

The use of two complementary output neurons is not essential, but advantageous as will be discussed later with the aid of FIGS. 7A to 7F.

The parameters or coefficients of the neural networks (kernels of the convolutional layers CC1, CC2 and CC3, synaptic weights of the perceptron layers) are learned, in a supervised manner, using, for example, a gradient descent algorithm. For example, in the embodiment discussed below with reference to FIGS. 4 to 6, a stochastic gradient descent algorithm is used with a training rate of 0.01 which decreases by 0.001 on each iteration, a moment of 0.9 and the use of the Nesterov moment, the training being performed over 10 iterations on batches of 1000 examples.

More specifically, in this embodiment, the cost function used and minimized during the training phase for this identification network is cross binary entropy, defined as:

$$L(y_{pred}, y_{real}) = y_{real}\cdot\log(y_{pred}) + (1-y_{real})\cdot\log(1-y_{real}) \quad \text{[Math. 6]}$$

in which yreal is the true value that the neuron should have at the output and ypred is the value predicted by the network.

The training of the network for evaluating proportions is performed with norm 1 normalized synthetic spectra. The output to be predicted by the first neuron is the proportion of the radioelement in the mixture and that of the second neuron is the proportion of the other radioelements.

The cost function used and minimized for this network is the mean quadratic deviation:

$$L(y_{pred}, y_{real}) = (y_{pred}, y_{real})^2 \quad \text{[Math. 5]}$$

The two cost functions are evaluated by average over all of the examples of the database.

Figure 2:
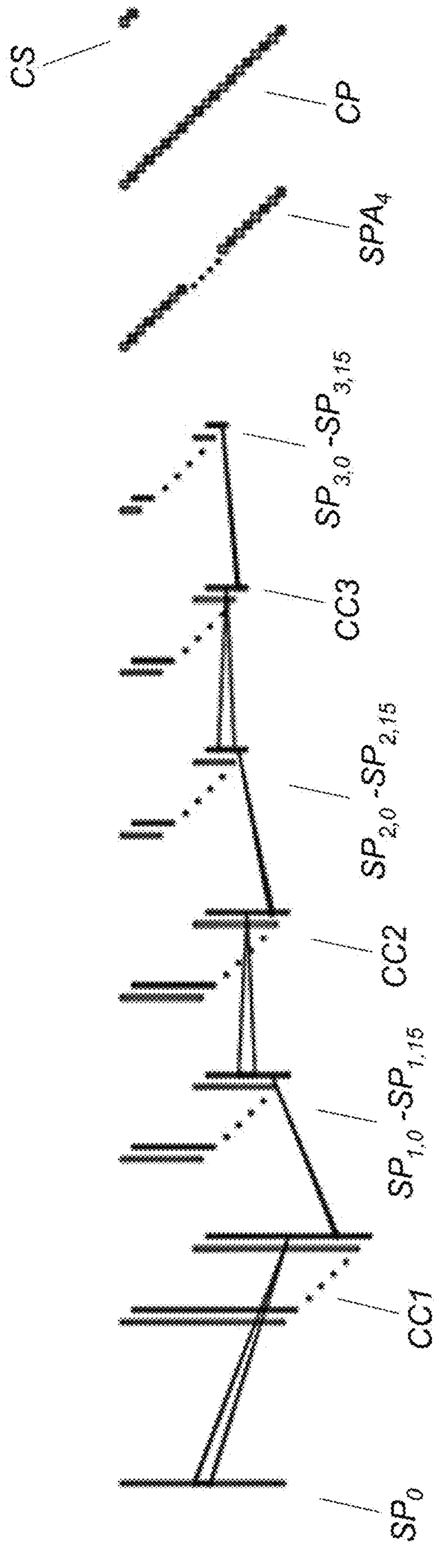
FIG. 2 is a representation of a convolutional neural network that can be used in a device and/or a method according to the invention.

The "Bayesian" character of the neural network of [FIG. 2] is obtained by randomly dropping out a fraction of the neurons of the intermediate layers ("dropout"), see (Gal 2016), and that applies equally in the training and during the use of the network. Each neural network is applied a plurality of times to each input spectrum and, because of the random switching off of the neurons, each time it returns a different result whose statistical distribution informs on the uncertainty affecting the identification of an emitting atomic species and/or the proportion thereof. For example, in the embodiment discussed below with reference to FIGS. 4 to 6, the dropout rate of the neurons is 50% for each of the intermediate layers and each neural network is applied 100 times.

Figure 3:
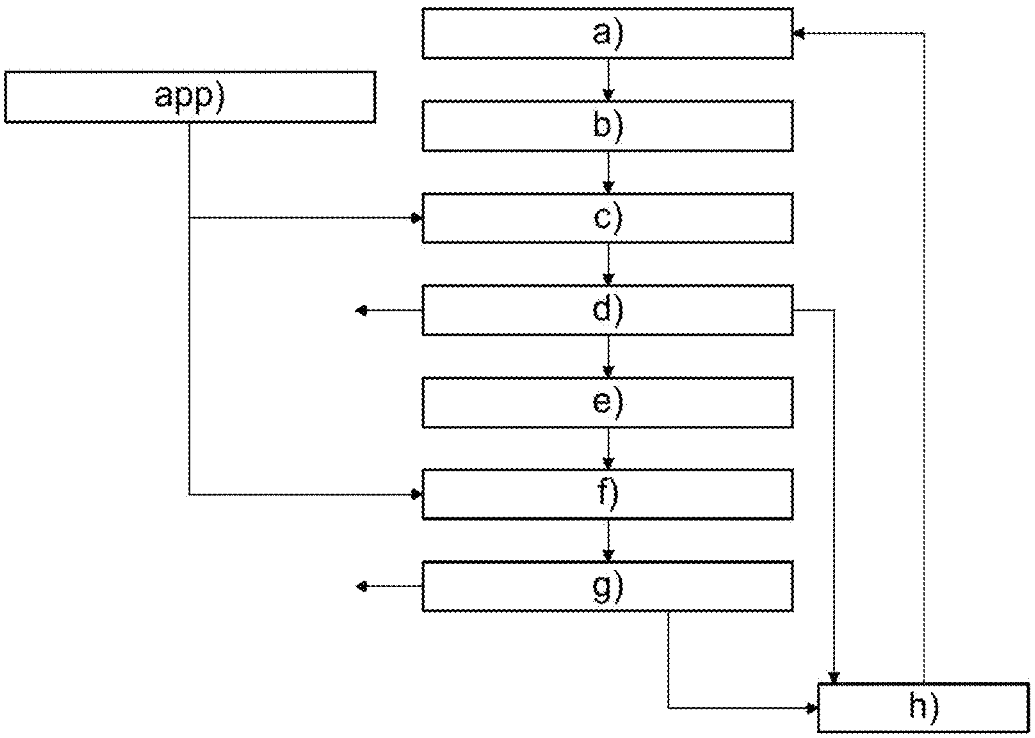
FIG. 3 is a flow diagram of a method according to an embodiment of the invention.

FIG. 3 schematically illustrates the method for identifying emitting atomic species described above.

Step a) comprises the acquisition of a spectrum by means of the spectrometric detector SPM.

Step b) comprises the transformation of the data prior to the application of the identification neural networks—that is to say, in a preferred embodiment of the invention—the conversion of the spectrum to the logarithmic scale and the normalization thereof.

Step c) comprises the application of the convolutional neural networks, preferably Bayesian, to the spectrum transformed by step c).

Step d) comprises the identification of the emitting species present in the scene as a function of the outputs of the identification neural networks.

Step e) comprises the transformation of the data prior to the application of the proportion neural networks—that is to say, in a preferred embodiment of the invention—the normalization of the spectrum as norm 1.

Step f) comprises the application of the convolutional neural networks, preferably Bayesian, to the spectrum transformed by step e).

Step g) comprises the determination of the proportions of the emitting species identified in step d) as a function of the outputs of the proportion neural networks.

Step h) corresponds to the self-calibration, which updates the calibration tables used for the implementation of step a).

The prior step app) corresponds to the training of the neural networks used in steps c) and f).

The method can be stopped at step c) if only the identification of the emitting species is required, even at step g) if the self-calibration is not used.

The invention was tested by using, as spectrometric detector, a semiconductor-based pixelated spectro-imager CdTe and its optimized reading circuits (Gevin 2012). The spectro-imager comprises 256 pixels at a pitch of 800 μm with a thickness of 2 mm, an energy dynamic range of 1 keV to 1 MeV, and an energy resolution of 0.7 keV (total width at mid-height) to 60 keV.

Similar results were obtained by using a spectro-imager of the same type but having a thickness of 1 mm and a pitch of 625 μm. The change of detector does not even require retraining of the neural networks, which confirms the robustness of the identification method according to the invention.

The spectro-imager was installed in a vacuum chamber, cooled by Peltier modules to a temperature of approximately −15° C. and subjected to a polarization field of 300 V/mm. The signal recorded by the reading circuits is transmitted to a programmable digital circuit Zynq via an interface card CIF. The digital circuit stores the events and transmits them to a control computer on which the spectro-identification process is performed. The events are returned in the form of a list containing the interaction pixel, the non-calibrated deposited energy and the interaction date. The sum spectrum of all the pixels is pre-calibrated with a calibration table determined in advance by a single initial calibration in the laboratory (as a variant, the theoretical transfer function of the acquisition chain could be applied).

The synthetic data were generated using semi-analytical simulation by modelling the detector and its very near environment, namely the structure which contains the detector. The photon-material interactions in the environment and in the detector were simulated and the energy deposits in the detector as well as their position were recorded. A Geant4 simulator can also be used to perform these simulations.

For each energy deposit, the statistical energy fluctuations were taken into account by drawing an energy into a Gaussian centered on the deposited energy E0, of standard deviation $$\sigma = \sqrt{\varepsilon_W E_0 F}\text{, in which} \quad \text{[Math. 7]}$$

εw=4.42 eV is the electron-hole pair creation energy in the CdTe and F=0.15 is the Fano factor for the CdTe.

To take account of the loss of charge, the weighting potential in the detector was calculated by solving the Poisson equation ΔUw=0 in terms of cylindrical coordinates on the detector using the finite differences resolution method, with the limiting condition of setting 1 on the electrode on which the signal is induced and 0 on the other electrodes and on the cathode. The simulation domain was extended to two electrodes on either side of the electrode on which the signal is induced. As a variant, a finite elements resolution method could have been used. Then, the loss of charge CCE was calculated as a function of the depth z0 using the Hecht equation:

$$CCE(z_0) = \int_{z_0}^{L} \exp\left(-\frac{z - z_0}{\mu_e \tau_e \frac{V_0}{L}}\right) \frac{\partial U_w}{\partial z}(z)dz + \int_{0}^{z_0} \exp\left(-\frac{z - z_0}{\mu_h \tau_h \frac{V_0}{L}}\right) \frac{\partial U_w}{\partial z}(z)dz \quad \text{[Math. 8]}$$

in which, μeτe=1.14·10−3 cm²·V−1, μhτh=3.36·10−4 cm²·V−1, L=2 mm and V0=600 V.

The energy ECCE at the interaction depth z0 was calculated by $$E_{CCE} = E_F \cdot \frac{CCE(z_0)}{\max_z (CCE(z))}. \quad \text{[Math. 9]}$$

It would also have been possible to calculate the loss of charge in 3D in the detector and not only in 1D to obtain a more faithful model of the response of the detector which is not however essential for the training of the neural network.

The error linked to the electronic noise was taken into account by drawing the final energy recorded in a Gaussian centered on ECCE with a standard deviation σ=εw rms in which rms=50 e− corresponds to the number of electrons rms due to the electronic noise.

To create the lists of mixtures of atomic species, between 10 and 10 million photons were drawn in each list of events of each individually simulated radioelement, the drawing being performed with restoration, which means that the same energy can be drawn several times. The decalibration was performed by taking σgain=0.0055 and σoffset=0.5 keV. In this way, 200 000 synthetic mixtures were produced.

The synthetic spectra were obtained by making a histogram composed of 2000 channels of 0.5 keV width over an energy dynamic range of 0 to 1 MeV.

The neural networks used for the identification and the determination of the proportions are as described above with reference to FIG. 2.

Figure 4:
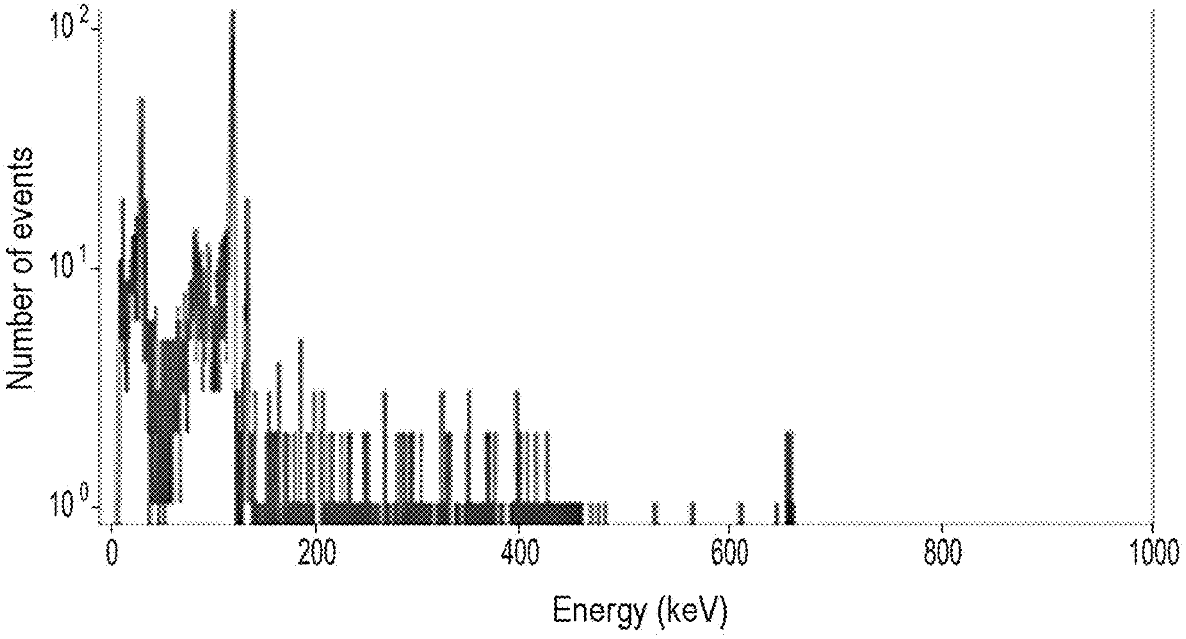
FIG. 4 is an example of X- or gamma radiation spectrum.

FIG. 4 shows a spectrum (represented to logarithmic scale) obtained by exposing the spectro-imager to a mixture comprising 57Co and 137Cs. Note that the number of photons detected is relatively low, of the order of a few thousand.

Figure 5:
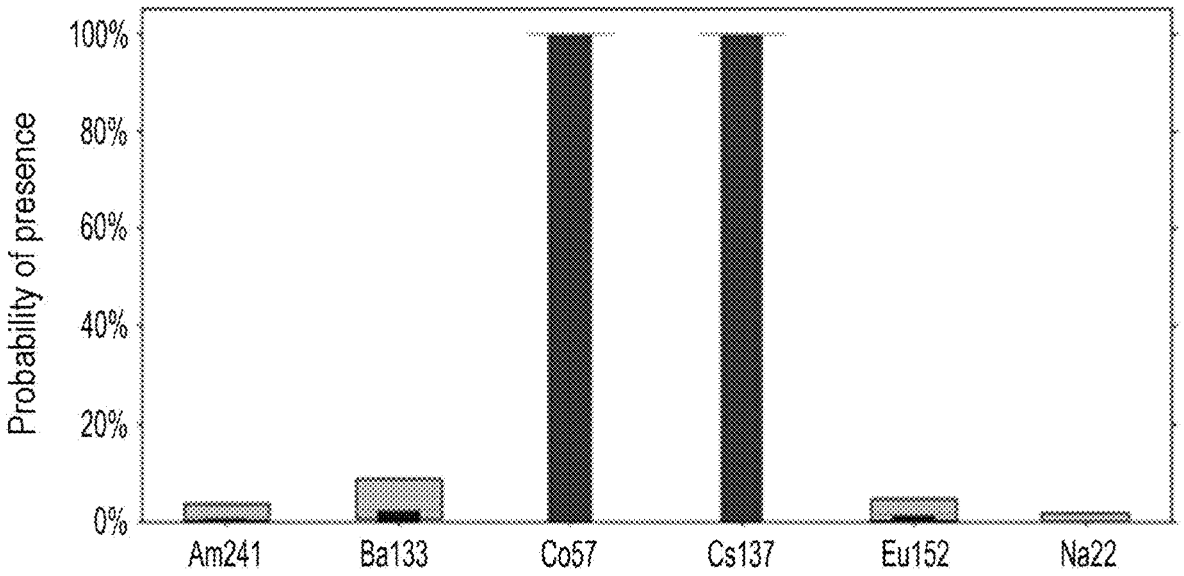
FIG. 5 illustrates the identification of the atomic species causing the radiation of FIG. 4.

FIG. 5 illustrates the output values of several identification neural networks, corresponding to these nuclides but also to others which are not present in the scene (241Am, 133Ba, 152Eu, 22Na). More specifically, as each neural network is applied 100 times by randomly dropping out 50% of the neurons on each repetition, a statistical distribution of the outputs is obtained. The vertical bars represent the medians, the error boxes correspond to the first and third quartiles and the error bars to the first and ninth deciles.

The detection threshold is set at 0.5 on the median, which is natural if it is considered that the output of an identification network represents the probability of presence of the corresponding emitting species. Note that the statistical dispersion of the outputs is negligible for the radionuclides actually present and, for the others, low enough so as not to create any risk of false positives.

Figure 6:
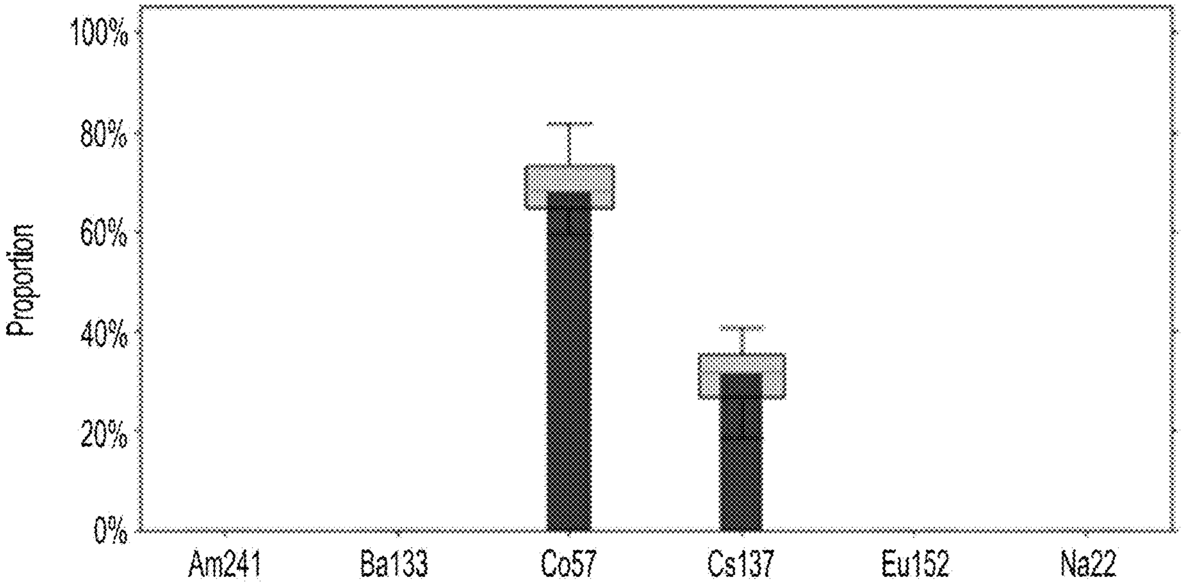
FIG. 6 illustrates the determination of the proportions of these atomic species.

FIG. 6 illustrates the statistical distribution (median and error bar corresponding to the first and ninth decile) of the proportions of 57Co and of 137Cs (more specifically, of their contributions to the total number of photons detected), obtained by applying the corresponding proportion neural networks 100 times, each time dropping out 50% of the neurons.

Figure 7A:
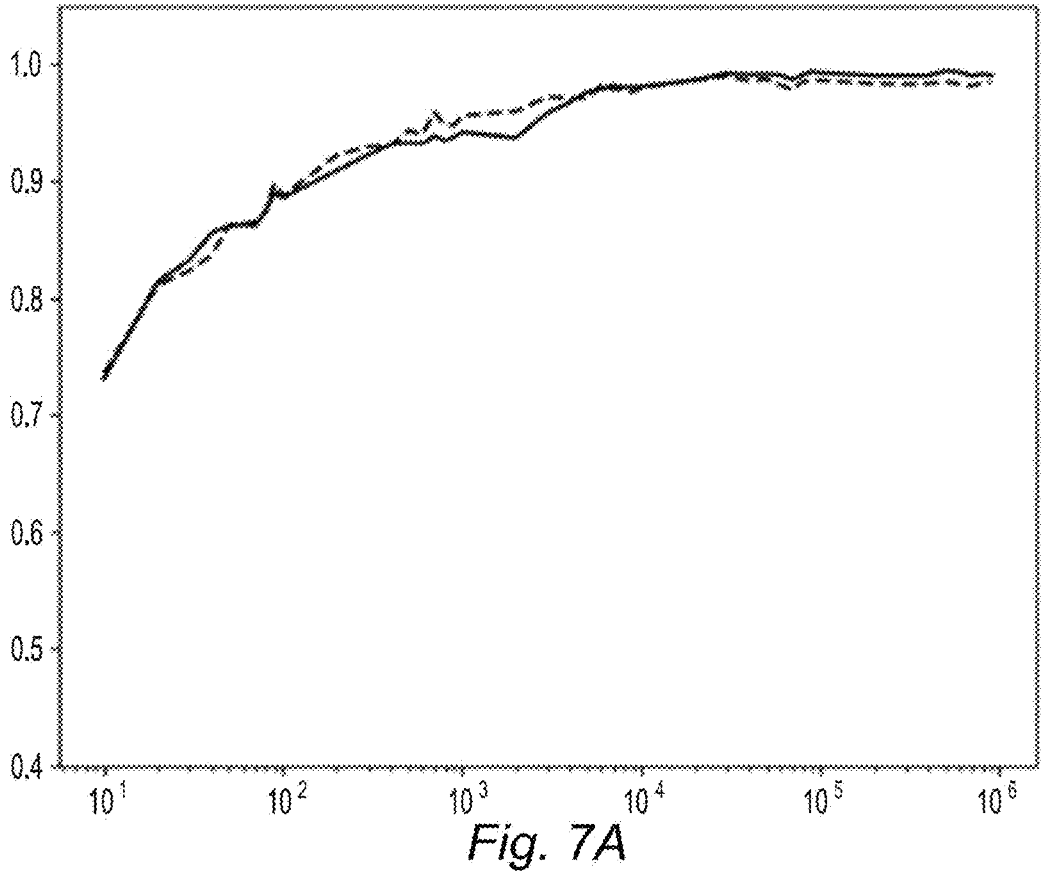
FIGS. 7A-7F illustrate the advantage conferred by the use of neural networks that have two complementary outputs rather than a single output.
Figure 7B:
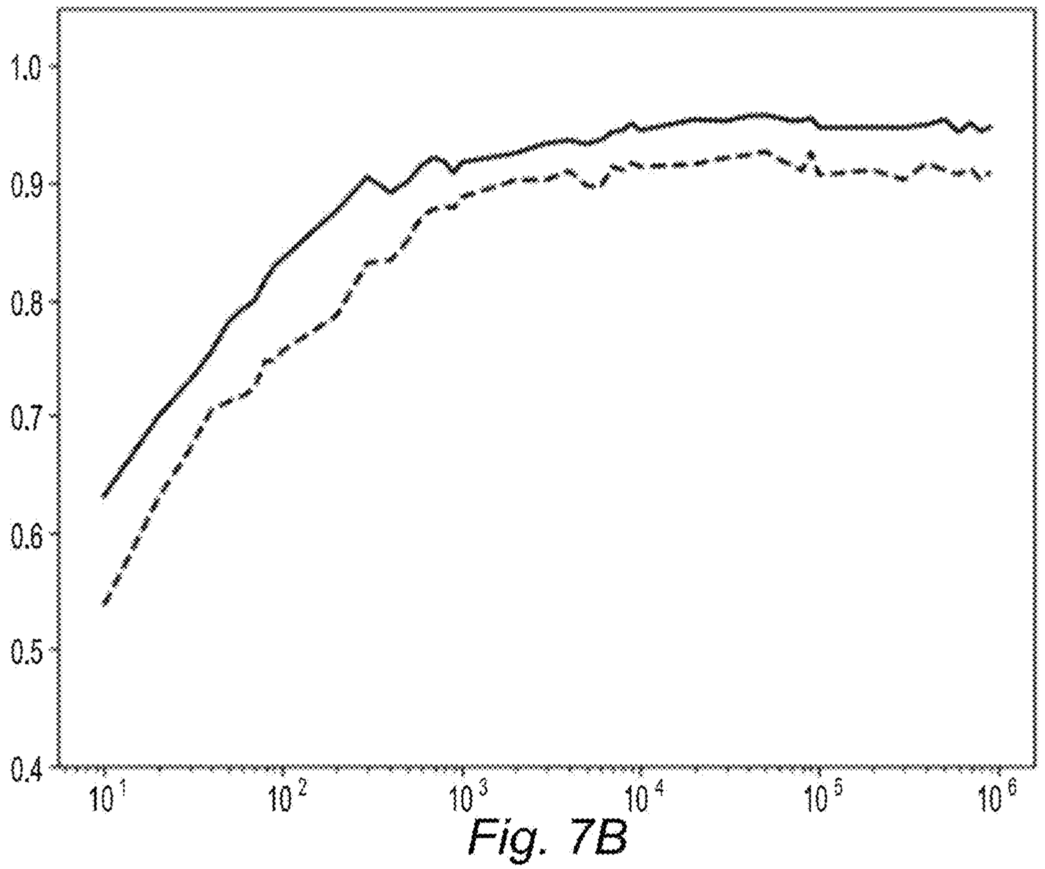
Figure 7C:
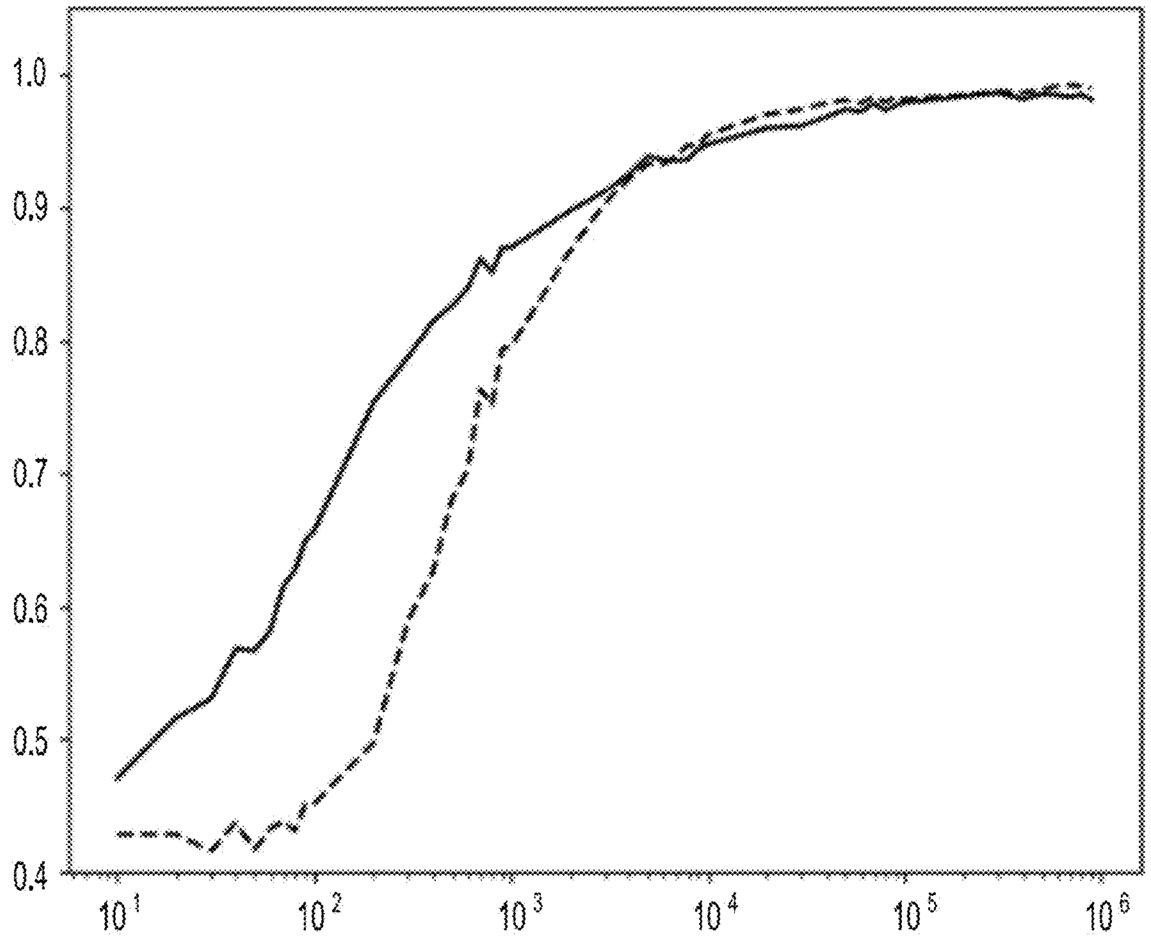
Figure 7D:
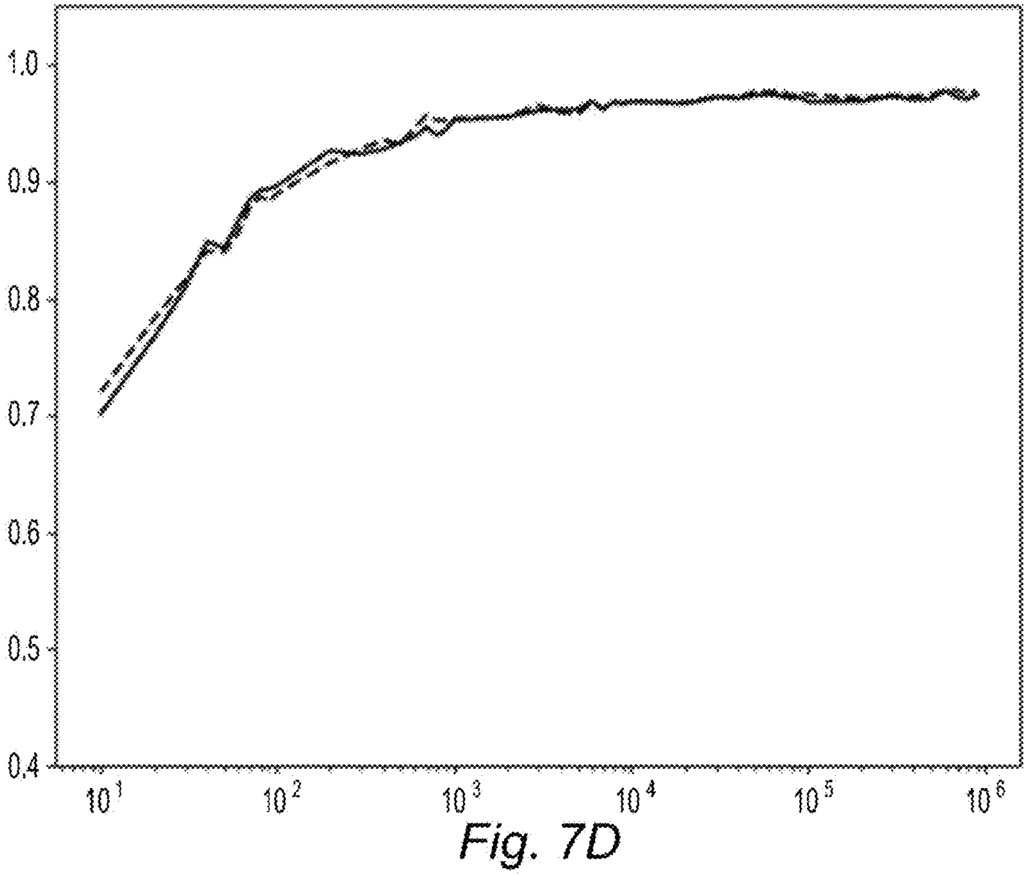
Figure 7E:
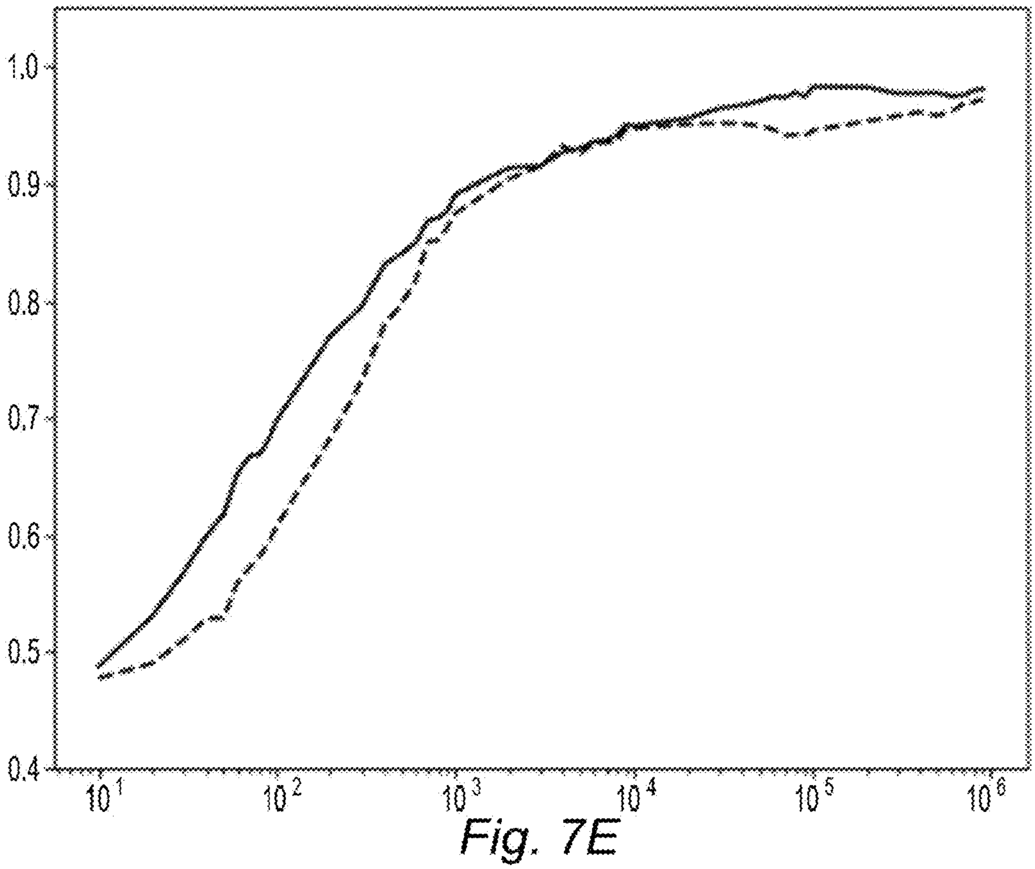
Figure 7F:
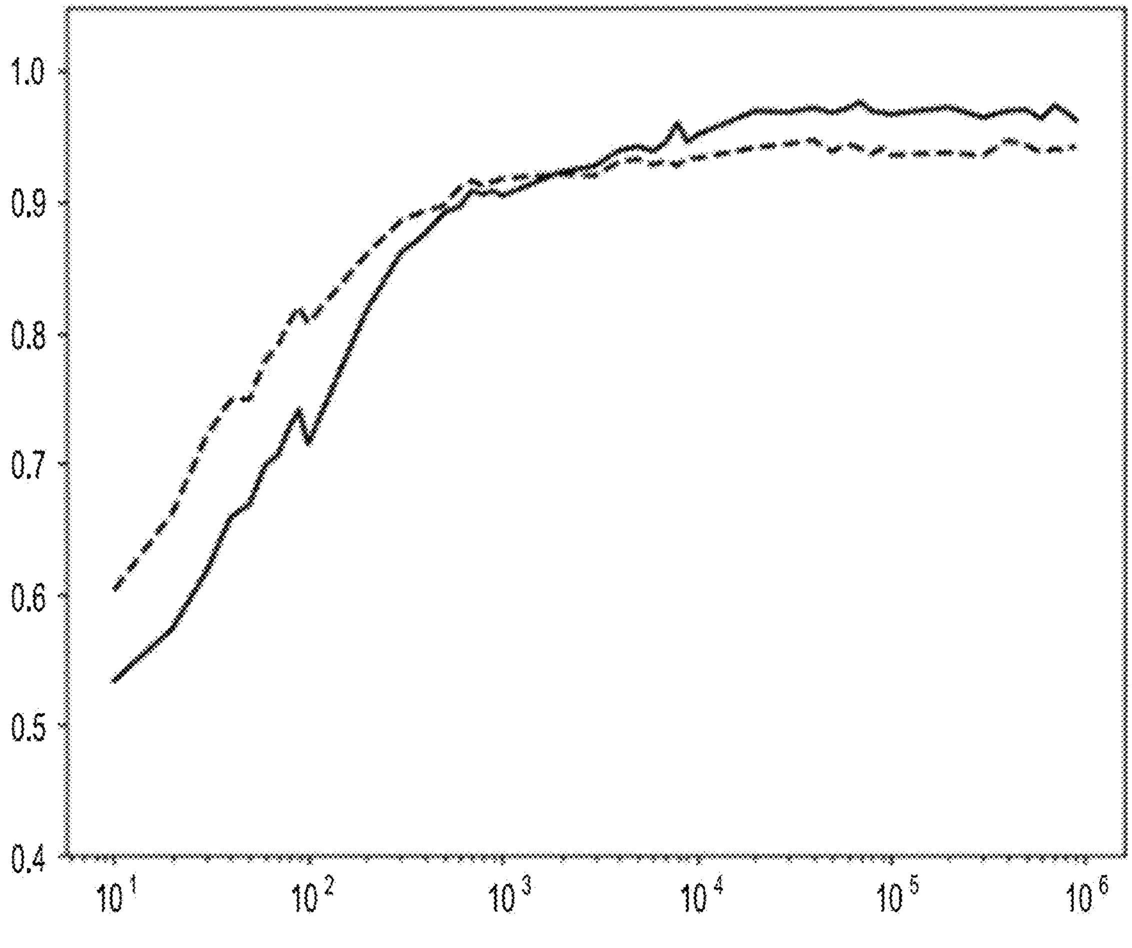

FIGS. 7A to 7F illustrate the advantage obtained by the use of neural networks having two complementary outputs with an activation function of softmax type. In these figures, the continuous line curves represent the good response rate (1: absence of identification errors) in the case of a softmax activation function as a function of the number of photons detected, while the broken line curve corresponds to single-output neurons, with a sigmoid activation function (the softmax function cannot be used with a single output neuron, it would always return 1). Each point of these graphs corresponds to the average rate of good responses over 2500 mixtures of sources. The different graphs correspond to different radionuclides: 241Am (FIG. 7A), 133Ba (FIG. 7B), 22Na (FIG. 3C), 152Eu (FIG. 7D); 137Cs (FIG. 7E), 57Co (FIG. 7F).

The results show that the performance levels of the networks with one output neuron are equivalent to those of the networks with two output neurons in the case of the sources of 241Am and 152Eu. In the case of the sources of 57Co and 22Na, the relative performance levels depend on the number of photons, and in the case of the 22Na, the performance levels of the network with one output neuron exceed those of the network with two output neurons by very little. Finally, in the case of the 133Ba and 137Cs, the neural networks with two outputs surpass the neural network with a single output.

Generally, at least in the configuration tested, it appears preferable to use a neural network with two outputs.

In all cases, it will be noted that the rate of good responses is close to or greater than 0.9 as soon as the number of photons reaches 103.

An important aspect of the invention is the separation of the steps of identification of the emitting species and of determination of their proportions, which are implemented by distinct sets of neural networks.

That makes it possible to use different spectrum preprocessing operations for the two operations. For the identification, a "logarithmic normalization" is preferably used, which makes it possible to give importance even to the structures which are composed of few photons, which is particularly interesting because the probability of interaction of the photons in the detector decreases greatly when the energy of the photons increases. For the network for evaluating proportions, on the other hand, the invention preferably uses a linear normalization (norm 1) which "ignores" the small structures. That is advantageous because the proportions of each source in the signal are linked linearly to their contribution in the spectrum. Experimentally, it was found that the use of a "logarithmic normalization" for the evaluation of the proportions does not give good results.

Figure 8A:
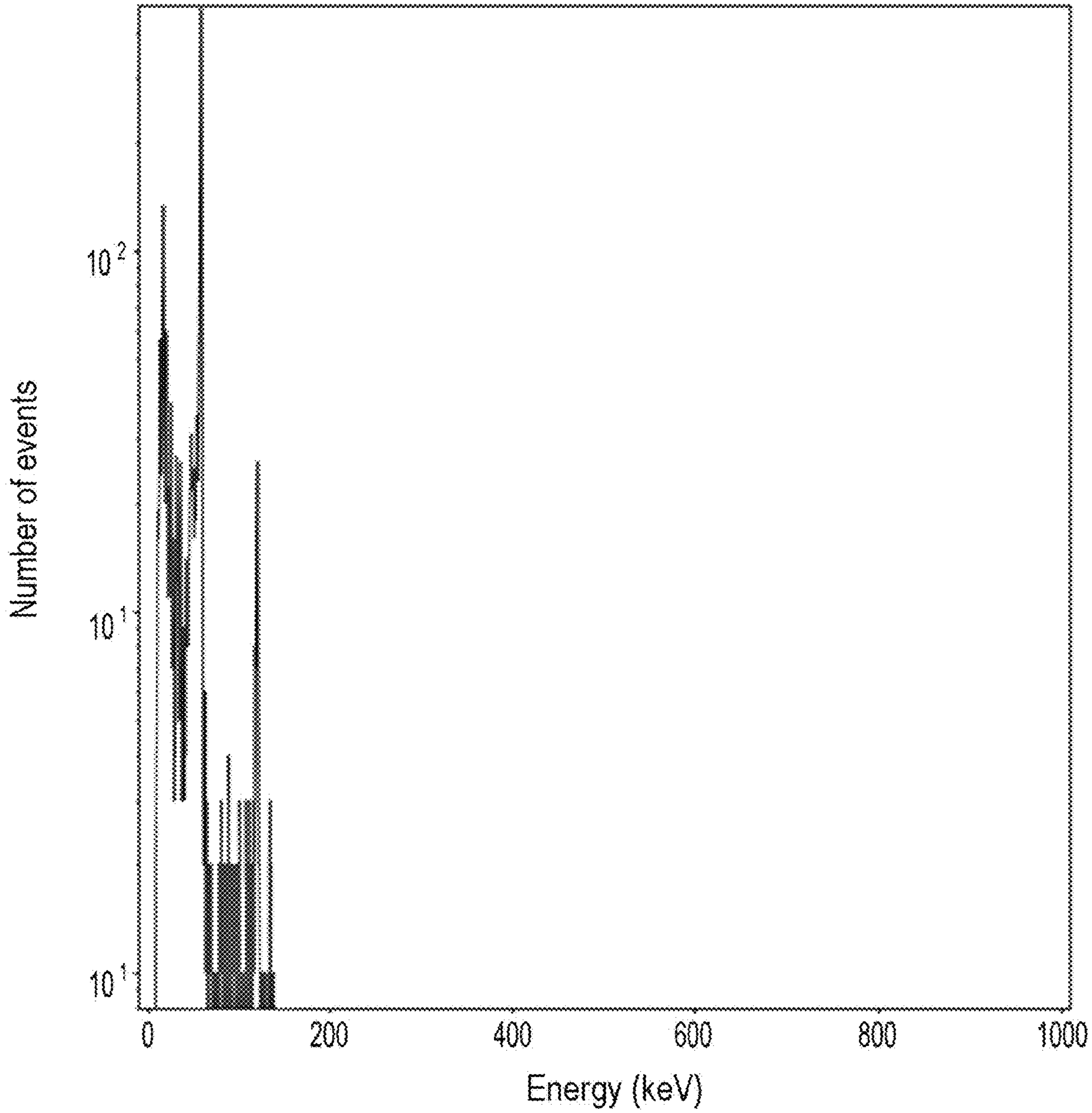
FIG. 8A-8C illustrate the advantage conferred by the use of separate neural networks for the identification of the atomic species and for the quantification of their contribution to the radiation.
Figure 8B:
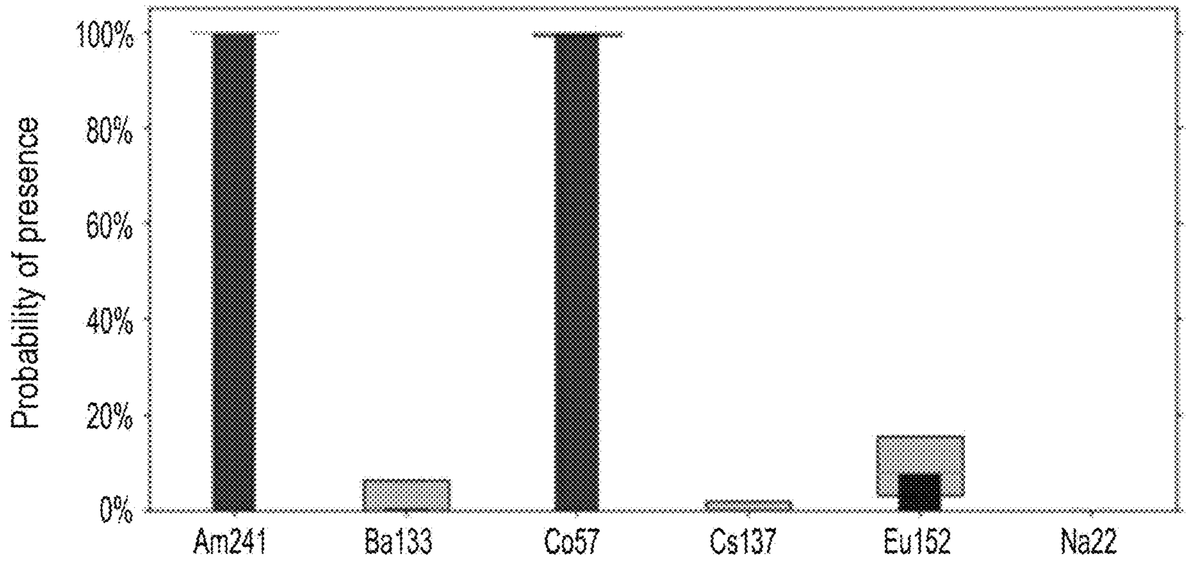
Figure 8C:
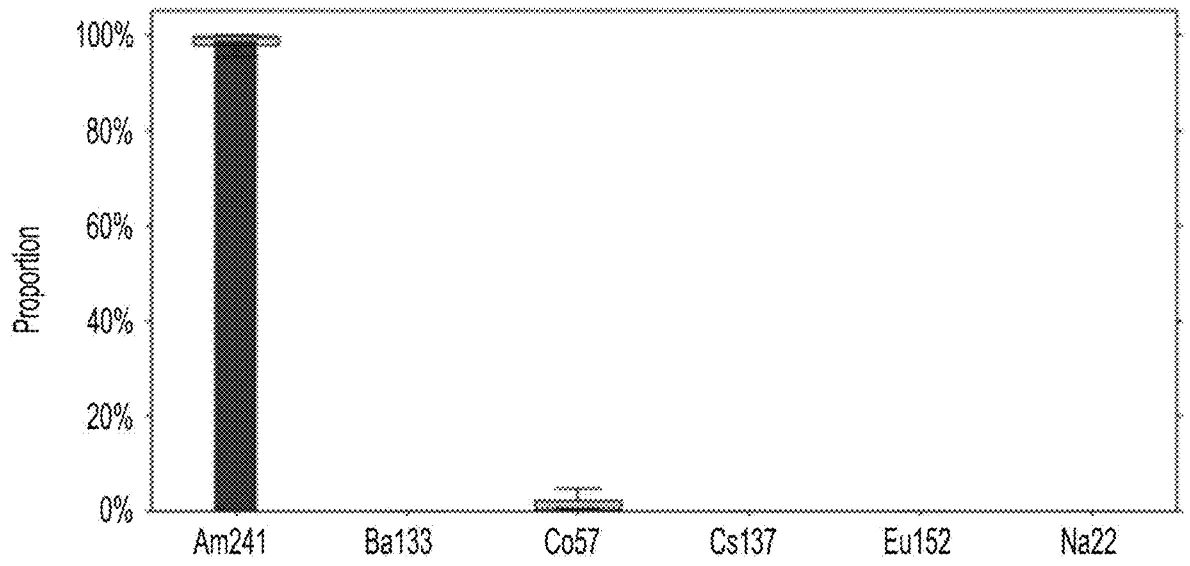

That is illustrated by figures FIG. 8A, FIG. 8B and FIG. 8C.

The spectrum of FIG. 8A was analyzed by the method of the invention. FIG. 8B shows that the identification networks make it possible to confirm with certainty the presence of 241Am and of 57Co. The networks for evaluating proportions however give a proportion of 0.7% for the 57Co and of 99.3% for the 241Am.

If only the proportions had been determined, as in certain methods of the prior art, it would have been impossible to know if 57Co was really present in the trace state, or it was in reality absent like, for example, 133Ba, 137Cs and 22Na. The use of distinct identification networks distinct from the proportion networks makes it possible to unambiguously determine that 57Co is really present, although in low proportion.

The method and the device of the invention offer several advantages over the prior art.

The use of a distinct neural network for each source that is desired to be identified makes it possible to not restrict the number of atomic species that can be identified. The addition of new sources, furthermore, is possible by adding new networks without changing the overall architecture and performing retraining only for the perceptron part. On the other hand, there is no need to perform the training again on the convolutional layers.

As a variant, it is possible to associate a neural network with a plurality of emitting species, for example a family of specifies exhibiting similar spectra. In this case, it is not the individual species which are identified, but groups or families of species.

The use of neural networks of convolutional type confers great robustness with respect to the calibration errors (temporal instability of the calibration law, variable instrumental responses from one spectrometric detector to another) and to changes of configuration (presence of absorbent or scattering materials between the source or sources and the spectrometric detector or detectors) by taking these problems into account in the database. Furthermore, it makes it possible to treat cases of spectra with low photon statistics with good performance levels (accuracy greater than 90% with spectra containing at least 1000 photons emanating from the mixture of sources). This method does not concentrate on particular peaks but on the general structure of the spectra (peaks, notably Compton structures).

The Bayesian approach makes it possible to quantify an error on the probability of presence of each source, which informs the user of the relevance of the results and therefore as to the degree of confidence that can be accorded to an automatic analysis.

Furthermore, no "expert" preprocessing is necessary, and the fine calibration is performed automatically. The recourse to qualified technicians is therefore greatly reduced.

As explained above, the separation of the steps of identification and of determination of the proportions makes it possible to reliably determine whether an atomic species is absent or indeed present but in low proportion.

The invention has been described with reference to a particular embodiment, but many variants can be envisaged.

For example, regarding the structure of the neural networks, the number of convolutional layers and of perceptron type, the activation functions, the data reduction method, the size of the convolution kernels etc. are given only by way of example. Moreover, it is not necessary for all the neural networks to be identical.

Other supervised learning techniques can be implemented. Moreover, the recourse to synthetic sources for the training is advantageous, but it is also possible to use real sources instead of or in addition.

Other data transformation operations prior to the application of the neural networks, and notably other normalization techniques, can be used.

The recourse to a random dropping out of the neurons is not essential, if information on the uncertainty of the measurements is not required. Moreover, when it is used, the random dropping out does not necessarily need to concern all of the intermediate layers.

Criteria other than a thresholding at 0.5 can be used to determine if an atomic species is considered to be present or absent, in particular if it is preferred to minimize the risk of false positives or, conversely, of false negatives.

Each neural network can have more than two outputs—for example one output indicative of the probability of presence of an emitting species, one output indicative of the probability of its absence and one output indicative of an indeterminate situation. Advantageously, these outputs are complementary (that is to say that their sum takes a set value, typically 1). The activation function of the outputs can be of Softmax type, but other possibilities can be envisaged by a person skilled in the art.

Data from several distinct spectrometric detectors can be combined.

BIBLIOGRAPHIC REFERENCES (Lutter 2018) G. Lutter, M. Hult, G. Marissens, H. Stroh, F. Tzika "A gamma-ray spectrometry analysis software environment" Applied Radiation and Isotopes 134 (2018): 200-204.

(Vigneron 1995) V. Vigneron, J. Morel, M.-C. Lepy, J.-M. Martinez "Statistical modelling by neural networks in gamma-spectrometry" Conference and International Symposium on Radionuclide Metrology (1995).

(Yoshida 2002) E. Yoshida, K. Shizuma, S. Endo, T. Oka "Application of neural networks for the analysis of gamma-ray spectra measured with a Ge spectrometer" Nuclear Instruments and Methods in Physics Research A 484 (2002).

(Medhat 2012) M. E. Medhat "Artificial intelligence methods applied for quantitative analysis of natural radioactive sources", Annals of Nuclear Energy 45 (2012).

(Olmos 1991) P. Olmos, J. C. Diaz, J. M. Perez, P. Gomez, V. Rodellar, P. Aguayo, A. Bru, G. Garcia-Belmonte, J. L. de Pablos "A New Approach to Automatic Radiation Spectrum Analysis" IEEE Transactions On Nuclear Science, Vol. 38, No. 4 (1991).

(Bobin 2016) C. Bobin, O. Bichler, V. Lourenco, C. Thiam, M. Thévenin "Real-time radionuclide identification in γ-emitter mixtures based on spiking neural network" Applied Radiation and Isotopes 109 (2016) 405-409 (2016).

(Kamuda 2017): M. Kamuda, J. Stinnett, C. J. Sulliva "Automated Isotope Identification Algorithm Using Artificial Neural Network" IEEE Transactions On Nuclear Science, Vol. 64, No. 7 (2017).

(Abdel-Aal 1997) R. E. Abdel-Aal, M. N. Al-Haddad "Determination of radioisotopes in gamma-ray spectroscopy using abductive machine learning" Nuclear Instruments and Methods in Physics Research A 391 (1997).

(Maier 2016) D. Maier, O. Limousin "Energy calibration via correlation", Nuclear Instruments and Methods in Physics Research, Section A: Accelerators, Spectrometers, Detectors and Associated Equipment, vol. 812, p. 43-49. (2016).

(Gal 2016) Y. Gal, Z. Ghahramani "Dropout as a Bayesian Approximation: Representing Model Uncertainty in Deep Learning", Proceedings of the 33rd International Conference on Machine Learning, New York, NY, USA, 2016. JMLR: W&CP volume 48.

(Gevin 2012) O. Gevin, et al. "Imaging X-ray detector front-end with high dynamic range: IDeF-X HD." Nuclear Instruments and Methods in Physics Research Section A: Accelerators", Spectrometers, Detectors and Associated Equipment 695 (2012): 415-419.

(Aloysius 2017) N. Aloysius, M. Geetha "A Review on Deep Convolutional Neural Network" International Conference on Communication and Signal Processing, April 2017, Inde.

(Ioffe 2015) S. Ioffe, C. Szgedy Geetha "Batch Normalization: Accelerating Deep Network Training by Reducing Internal Covariate Shift" Proceedings of the 32nd International Conference on Machine Learning, 2015, France.

The invention claimed is:

1. A method for identifying emitting species emitting X- or gamma radiation in a scene, the method comprising:

a) acquiring, by a signal processing circuit based on data generated by a spectrometric detector, a spectrum of an X- or gamma radiation emanating from the scene, the spectrum being a histogram;

b) applying to the acquired spectrum, utilizing the signal processing circuit, a first data transformation operation including converting the acquired spectrum to a logarithmic scale, and at least one normalization subsequent to said converting, to obtain a transformed spectrum, the transformed spectrum being a normalized histogram;

c) supplying the transformed spectrum as input of a first set comprising at least two convolutional neural networks implemented by the signal processing circuit, each convolutional neural network of the first set being associated with a respective and distinct group of one or more emitting species to be identified, each convolutional neural network of the first set comprising an output layer and a layer comprising a plurality of neurons, each convolution neural network of the first set is trained, is being trained, or is configured to be trained to individually identify the associated group of one or more emitting species, and each convolution neural network of the first set having at least one output;

d) for each convolutional neural network of the first set, determining, utilizing the signal processing circuit, whether the associated group of one or more emitting species is present in the scene based on said at least one output;

e) applying to the acquired spectrum, utilizing the signal processing circuit, a second data transformation operation including a norm 1 normalization without logarithmic conversion to obtain a second transformed spectrum, the second transformed spectrum being a second normalized histogram;

f) supplying the second transformed spectrum as input of a second set comprising at least two convolutional neural networks implemented by the signal processing circuit, each convolutional neural network of the second set:

being associated with a respective and distinct group of one or more emitting species, the group of one or more emitting species having been determined as being present in the scene following step d); and having at least one output; and g) for each convolutional neural network of the second set, determining, utilizing the signal processing circuit, a signal proportion of the associated group of one or more emitting species based on said at least one output, and each convolutional neural network of the second set is trained, is being trained, or is configured to be trained to individually determine the signal proportion of the associated group of one or more emitting species.

2. The method as claimed in claim 1, wherein:

step c) is repeated a plurality of times by randomly dropping out, each time, a fraction of the neurons of at least one intermediate layer; and step d) comprises, for each convolutional neural network of the first set, the determining whether the associated group of one or more emitting species is present in the scene and a calculating of a rate of confidence of said determining whether the associated group of one or more emitting species is present in the scene based on a statistical analysis of values taken by said at least one output upon the repetitions of step c) for each convolutional neural network of the first set.

3. The method as claimed in claim 1, wherein:

each convolutional neural network of the second set comprises an input layer, an output layer and at least one intermediate layer, each intermediate layer comprising a plurality of neurons;

step f) is repeated a plurality of times by randomly dropping out, each time, a fraction of neurons of at least one intermediate layer; and step g) comprises, for each convolutional neural network of the second set, the determining of the signal proportion of the associated group of one or more emitting species and a calculating of a rate of confidence of said determining of the signal proportion of the associated group of one or more emitting species based on a statistical analysis of values taken by said at least one output upon different repetitions of step f).

4. The method as claimed in claim 1, wherein each convolutional neural network is associated with a single respective emitting species of the associated group of one or more emitting species.

5. The method as claimed in claim 1, wherein step b) comprises a logarithmic transformation of the acquired spectrum.

6. The method as claimed in claim 1, also comprising a prior step of supervised training of the convolutional neural networks using simulated X- or gamma radiation spectra of mixtures of known composition of several emitting species.

7. The method as claimed in claim 6, wherein each convolutional neural network comprises an input layer, an output layer and at least one intermediate layer, each intermediate layer comprising a plurality of neurons; and said supervised training step is performed by randomly dropping out a fraction of the neurons of at least one intermediate layer.

8. The method as claimed in claim 1, wherein acquiring the spectrum of the X- or gamma radiation emanating from the scene comprises:

acquiring a series of events, each event being associated with a physical quantity representative of an energy value of an X- or gamma photon detected by the spectrometric detector; and converting said series of events into the spectrum of the X- or gamma radiation by application of a calibration function dependent on a set of calibration parameters;

and wherein the method further comprises:

h) determining optimal values of the set of calibration parameters by maximization of a correlation function between the spectrum and a theoretical spectrum calculated as a function of the emitting species determined as being present in the scene.

9. The method as claimed in claim 8, wherein the spectrometric detector is a pixelated detector and the calibration is done pixel by pixel, with a different calibration table for each pixel.

10. The method as claimed in claim 1, wherein each convolutional neural network comprises a pair of complementary output neurons.

11. The method as claimed in claim 1, wherein the acquired spectrum extends, wholly or partly, within a range lying between 2 keV and 2 MeV.

12. A non-transitory computer-readable medium storing instructions which, when executed by a computer, lead the computer to implement steps b) and subsequent steps of the method as claimed in claim 1, the computer receiving as input the acquired spectrum from the spectrometric detector, the computer identifying the at least two groups of one or more emitting species emitting X- or gamma ray radiation associated with the first set of convolutional neural networks.

13. A device for identifying emitting species emitting X- or gamma radiation in a scene, comprising:

a signal processing circuit processing signals generated by a spectrometric detector, said signal processing circuit being configured or programmed to:

acquire from said detector a series of events, each event being associated with a physical quantity representative of an energy value of an X- or gamma photon detected by said spectrometric detector;

convert said series of events into an energy spectrum of the X- or gamma radiation by application of a calibration function dependent on an initial set of calibration parameters stored in a table, said spectrum being a histogram;

apply to the energy spectrum of the X- or gamma radiation a first data transformation operation including converting the acquired spectrum to a logarithmic scale, and at least one normalization subsequent to said converting to obtain a transformed spectrum, the transformed spectrum being a normalized histogram;

supply the transformed spectrum as input of a first set comprising at least two convolutional neural networks, each convolutional neural network of the first set being associated with a respective and distinct group of one or more emitting species, each convolutional neural network of the first set comprises an output layer and a layer, the layer comprising a plurality of neurons, each convolution neural network trained to individually identify the associated group of one more emitting species and each convolutional neural network of the first set having at least one output;

for each convolutional neural network of the first set, determine as a function of said at least one output whether the associated group of one or more emitting species is present in the scene and calculate a rate of confidence of said determining;

apply, to the energy spectrum of the X- or gamma radiation, a second data transformation operation including a norm 1 normalization without logarithmic conversion to obtain a second transformed spectrum;

supply the second transformed spectrum as input of a second set comprising at least two convolutional neural networks, each convolutional neural network of the second set being associated with a respective and distinct group of one or more emitting species, said group of one or more emitting species having been determined as being present in the scene and having at least one output, the output being scalar; and for each convolutional neural network of the second set, determine, as a function of said at least one output, a signal proportion of the associated group of one or more emitting species.

14. The device as claimed in claim 13, wherein the signal processing circuit processing signals generated by the spectrometric detector is also configured or programmed to determine values of calibration parameters which maximize a correlation function between said energy spectrum and a spectrum calculated as a function of the group or groups of one or more emitting species associated with the first set of convolutional neural networks determined as being present in the scene and using said values of calibration parameters to update the table.

15. The device as claimed in claim 13, wherein each convolutional neural network is associated with a single respective emitting species of the group of one or more emitting species.

16. The device as claimed in claim 13, wherein each convolutional neural network comprises a pair of complementary output neurons.

17. The device as claimed in claim 13, wherein the X- or gamma photons detected exhibit an energy within at least a part of the range lying between 2 keV and 2 MeV.

18. The device as claimed in claim 13, also comprising said spectrometric detector.

* * * * *